United States Patent
Song et al.

(10) Patent No.: US 12,140,109 B2
(45) Date of Patent: Nov. 12, 2024

(54) TRANSPIRATION-COOLED SYSTEMS HAVING PERMEABLE AND NON-PERMEABLE PORTIONS

(71) Applicant: Blue Origin, LLC, Kent, WA (US)

(72) Inventors: Weidong Song, Woodinville, WA (US); Kutter Kupke, Renton, WA (US); Alexander Twaites, Seattle, WA (US)

(73) Assignee: Blue Origin, LLC, Kent, WA (US)

( * ) Notice: Subject to any disclaimer, the term of this patent is extended or adjusted under 35 U.S.C. 154(b) by 0 days.

(21) Appl. No.: 18/193,005

(22) Filed: Mar. 30, 2023

(65) Prior Publication Data
US 2024/0328373 A1   Oct. 3, 2024

(51) Int. Cl.
*F02K 9/97* (2006.01)
*B64G 1/58* (2006.01)
(Continued)

(52) U.S. Cl.
CPC ............... *F02K 9/972* (2013.01); *B64G 1/58* (2013.01); *B64G 1/62* (2013.01); *F02K 9/64* (2013.01); *F02K 9/97* (2013.01); *F05D 2230/31* (2013.01)

(58) Field of Classification Search
CPC ... F02K 9/64; F02K 9/97; F02K 9/972; B64G 1/58; B64G 1/62
See application file for complete search history.

(56) References Cited

U.S. PATENT DOCUMENTS 3,069,847 A * 12/1962 Vest, Jr. .................... F02K 9/64
239/127.3
3,585,800 A *  6/1971 Kuntz ....................... F02K 9/64
60/265
(Continued)

FOREIGN PATENT DOCUMENTS

AU   2018359514 B2   10/2018
AU   2018359514 A1    5/2019
(Continued)

OTHER PUBLICATIONS

Das, S. et al., "Selective Laser Sintering of High Performance High Temperature Materials", Laboratory for Freeform Fabrication, University of Texas at Austin, 1996, pp. 89-96.
(Continued)

*Primary Examiner* — Kyle Robert Thomas
(74) *Attorney, Agent, or Firm* — Knobbe, Martens, Olson & Bear, LLP

(57) ABSTRACT

Transpiration-cooled systems having permeable and non-permeable portions are provided. In one aspect, a nozzle for a rocket engine includes a non-permeable outer layer, a plurality of walls, a permeable layer, and a plurality of cooling channels. The non-permeable outer layer forms a predetermined shape of the nozzle and defines an interior space. The plurality of walls extend generally orthogonal to the non-permeable outer layer and into the interior space. The permeable layer is disposed between each set of adjacent walls of the plurality of walls. The permeable layer is spaced a distance from the non-permeable outer layer. The plurality of cooling channels are formed between the permeable layer, the non-permeable outer layer, and a set of adjacent walls of the plurality of walls. The plurality of cooling channels are configured to transport a fluid.

20 Claims, 6 Drawing Sheets

(51) Int. Cl.
  *B64G 1/62* (2006.01)
  *F02K 9/64* (2006.01)

(56) References Cited

U.S. PATENT DOCUMENTS

| | | | |
|---|---|---|---|
| 5,233,755 A * | 8/1993 | Vandendriessche | F02K 9/64 60/222 |
| 5,697,511 A | 12/1997 | Bampton | |
| 6,050,474 A | 4/2000 | Aota et al. | |
| 6,151,887 A * | 11/2000 | Haidn | F02K 9/972 60/257 |
| 6,536,651 B2 | 3/2003 | Ezumi et al. | |
| 6,543,671 B2 | 4/2003 | Hatten et al. | |
| 6,606,851 B1 * | 8/2003 | Herdy, Jr. | C23C 4/137 239/127.3 |
| 6,669,075 B2 | 12/2003 | Colligan | |
| 6,779,707 B2 | 8/2004 | Dracup et al. | |
| 7,090,112 B2 | 8/2006 | Masingale | |
| 7,093,470 B2 | 8/2006 | El-Soudani | |
| 7,097,091 B2 | 8/2006 | Okamura et al. | |
| 7,128,532 B2 * | 10/2006 | Petervary | B64C 1/38 416/97 R |
| 7,430,888 B2 | 10/2008 | Osame | |
| 7,556,187 B2 | 7/2009 | Sunahara et al. | |
| 7,735,223 B2 | 6/2010 | Clark | |
| 7,854,958 B2 | 12/2010 | Kramer | |
| 7,866,532 B1 | 1/2011 | Potter et al. | |
| 8,079,126 B2 | 12/2011 | Bampton et al. | |
| 8,114,474 B1 | 2/2012 | Dudt et al. | |
| 8,141,764 B1 | 3/2012 | Potter et al. | |
| 8,272,424 B2 | 9/2012 | Short | |
| 8,316,916 B2 | 11/2012 | Heinrich et al. | |
| 8,348,136 B1 | 1/2013 | Potter et al. | |
| 8,397,974 B2 | 3/2013 | Schultz et al. | |
| 8,632,850 B2 | 1/2014 | Schultz et al. | |
| 8,636,194 B2 | 1/2014 | Schultz et al. | |
| 8,710,144 B2 | 4/2014 | Hesse et al. | |
| 8,875,976 B2 | 11/2014 | Schultz et al. | |
| 8,893,954 B2 | 11/2014 | Schultz et al. | |
| 9,027,378 B2 | 5/2015 | Crump et al. | |
| 9,101,979 B2 | 8/2015 | Hofmann et al. | |
| 9,205,578 B2 | 12/2015 | Schultz et al. | |
| 9,238,283 B2 | 1/2016 | Gniesmer | |
| 9,266,191 B2 | 2/2016 | Kandasamy et al. | |
| 9,511,445 B2 | 12/2016 | Kandasamy | |
| 9,511,446 B2 | 12/2016 | Kandasamy et al. | |
| 9,555,580 B1 | 1/2017 | Dykstra et al. | |
| 9,555,871 B2 | 1/2017 | Grip et al. | |
| 9,610,650 B2 | 4/2017 | Hofmann et al. | |
| 9,611,803 B2 | 4/2017 | Vieira De Morais et al. | |
| 9,643,279 B2 | 5/2017 | Schultz et al. | |
| 9,757,802 B2 | 9/2017 | Cui et al. | |
| 9,862,054 B2 | 1/2018 | Kandasamy et al. | |
| 9,931,789 B2 | 4/2018 | Wiesner et al. | |
| 9,937,587 B2 | 4/2018 | Kou et al. | |
| 9,943,929 B2 | 4/2018 | Schultz et al. | |
| 10,011,089 B2 | 7/2018 | Lyons et al. | |
| 10,022,796 B2 | 7/2018 | Wang | |
| 10,105,790 B2 | 10/2018 | Kandasamy | |
| 10,254,499 B1 | 4/2019 | Cohen et al. | |
| 10,259,041 B2 | 4/2019 | Gessler et al. | |
| 10,279,422 B2 | 5/2019 | Werz et al. | |
| 10,335,854 B2 | 7/2019 | Wiesner et al. | |
| 10,500,674 B2 | 12/2019 | Kandasamy et al. | |
| 10,543,529 B2 | 1/2020 | Schwarze et al. | |
| 10,583,519 B2 | 3/2020 | Litwinski | |
| 10,583,631 B2 | 3/2020 | Kandasamy et al. | |
| 10,625,374 B2 | 4/2020 | Schwarze | |
| 10,670,019 B2 | 6/2020 | Zinniel et al. | |
| 10,724,561 B2 | 7/2020 | Amira et al. | |
| 10,796,727 B1 | 12/2020 | Coffey et al. | |
| 10,857,596 B1 | 12/2020 | Mittendorf et al. | |
| 10,906,127 B2 | 2/2021 | Seo et al. | |
| 10,953,489 B2 | 3/2021 | Fröhlke et al. | |
| 11,014,292 B2 | 5/2021 | Marchione | |
| 11,077,607 B2 | 8/2021 | Snyder et al. | |
| 11,219,951 B2 | 1/2022 | Matthews et al. | |
| 11,229,972 B2 | 1/2022 | Mosaki et al. | |
| 11,260,468 B2 | 3/2022 | Frank et al. | |
| 11,311,959 B2 | 4/2022 | Hardwick et al. | |
| 11,415,380 B2 | 8/2022 | Chipko et al. | |
| 2002/0014070 A1 | 2/2002 | Stechman, Jr. et al. | |
| 2003/0042292 A1 | 3/2003 | Hatten et al. | |
| 2004/0074949 A1 | 4/2004 | Narita et al. | |
| 2004/0107019 A1 | 6/2004 | Keshavmurthy et al. | |
| 2004/0155094 A1 | 8/2004 | Okamoto et al. | |
| 2005/0035173 A1 | 2/2005 | Steel et al. | |
| 2005/0242158 A1 | 11/2005 | Bolser | |
| 2006/0102699 A1 | 5/2006 | Burton et al. | |
| 2006/0169741 A1 | 8/2006 | Smith et al. | |
| 2006/0289604 A1 | 12/2006 | Zettler et al. | |
| 2007/0152015 A1 | 7/2007 | Burton et al. | |
| 2007/0158343 A1 | 7/2007 | Shimada et al. | |
| 2007/0194051 A1 | 8/2007 | Bakken et al. | |
| 2007/0199978 A1 | 8/2007 | Ezumi | |
| 2008/0096038 A1 | 4/2008 | Nagano | |
| 2008/0128473 A1 | 6/2008 | Zhou et al. | |
| 2009/0188109 A1 | 7/2009 | Bampton et al. | |
| 2010/0140321 A1 | 6/2010 | Eller et al. | |
| 2010/0242843 A1 | 9/2010 | Peretti et al. | |
| 2010/0252169 A1 | 10/2010 | Feng et al. | |
| 2010/0285207 A1 | 11/2010 | Creehan et al. | |
| 2011/0262695 A1 | 10/2011 | Lee et al. | |
| 2012/0009339 A1 | 1/2012 | Creehan et al. | |
| 2012/0058359 A1 | 3/2012 | Kingston et al. | |
| 2012/0073732 A1 | 3/2012 | Perlman | |
| 2012/0273555 A1 | 11/2012 | Flak et al. | |
| 2012/0279441 A1 | 11/2012 | Creehan et al. | |
| 2012/0279442 A1 | 11/2012 | Creehan et al. | |
| 2013/0056912 A1 | 3/2013 | O'Neill et al. | |
| 2013/0068825 A1 | 3/2013 | Rosal et al. | |
| 2014/0130736 A1 | 5/2014 | Schultz et al. | |
| 2014/0134325 A1 | 5/2014 | Schultz et al. | |
| 2014/0165399 A1 | 6/2014 | Seo et al. | |
| 2014/0174344 A1 | 6/2014 | Scuhltz et al. | |
| 2014/0274726 A1 | 9/2014 | Sugimoto et al. | |
| 2015/0079306 A1 | 3/2015 | Schoeneborn et al. | |
| 2015/0165546 A1 | 6/2015 | Kandasamy et al. | |
| 2015/0321289 A1 | 11/2015 | Bruck et al. | |
| 2016/0074958 A1 | 3/2016 | Kandasamy et al. | |
| 2016/0075059 A1 | 3/2016 | Williams | |
| 2016/0090848 A1 | 3/2016 | Engeli et al. | |
| 2016/0107262 A1 | 4/2016 | Schultz et al. | |
| 2016/0169012 A1 | 6/2016 | Dacunha et al. | |
| 2016/0175981 A1 | 6/2016 | Kandasamy et al. | |
| 2016/0175982 A1 | 6/2016 | Kandasamy et al. | |
| 2016/0258298 A1 | 9/2016 | Channel et al. | |
| 2017/0022615 A1 | 1/2017 | Arndt et al. | |
| 2017/0043429 A1 | 2/2017 | Kandasamy et al. | |
| 2017/0057204 A1 | 3/2017 | Kandasamy et al. | |
| 2017/0080519 A1 | 3/2017 | Atin et al. | |
| 2017/0216962 A1 | 8/2017 | Schultz et al. | |
| 2017/0284206 A1 | 10/2017 | Roberts et al. | |
| 2017/0291221 A1 | 10/2017 | Swank et al. | |
| 2017/0299120 A1 | 10/2017 | Stachulla et al. | |
| 2017/0312850 A1 | 11/2017 | Werz et al. | |
| 2018/0085849 A1 | 3/2018 | Kandasamy et al. | |
| 2018/0296343 A1 | 10/2018 | Wei | |
| 2018/0361501 A1 | 12/2018 | Hardwick et al. | |
| 2019/0054534 A1 | 2/2019 | Norton et al. | |
| 2019/0168304 A1 | 6/2019 | Krol et al. | |
| 2019/0193194 A1 | 6/2019 | Grong et al. | |
| 2019/0217508 A1 | 7/2019 | McGinnis et al. | |
| 2019/0299290 A1 | 10/2019 | Kuhns et al. | |
| 2019/0388128 A1 | 12/2019 | Wilson et al. | |
| 2020/0016687 A1 | 1/2020 | Whalen et al. | |
| 2020/0047279 A1 | 2/2020 | Misak | |
| 2020/0063242 A1 | 2/2020 | Anglés | |
| 2020/0180297 A1 | 6/2020 | Carter et al. | |
| 2020/0209107 A1 | 7/2020 | Ream et al. | |
| 2020/0247058 A1 | 8/2020 | Flitsch et al. | |
| 2020/0262001 A1 | 8/2020 | Uetani | |
| 2020/0290127 A1 | 9/2020 | Berglund et al. | |
| 2020/0306869 A1 | 10/2020 | Hardwick et al. | |

(56) References Cited

U.S. PATENT DOCUMENTS

| | | | |
|---|---|---|---|
| 2020/0332421 | A1 | 10/2020 | Jahdie et al. |
| 2020/0338639 | A1* | 10/2020 | Friesth .................. G21C 1/00 |
| 2021/0008658 | A1 | 1/2021 | Frank et al. |
| 2021/0069778 | A1 | 3/2021 | Redding et al. |
| 2021/0078258 | A1 | 3/2021 | Lalande et al. |
| 2021/0180165 | A1 | 6/2021 | Pasebani et al. |
| 2021/0245293 | A1 | 8/2021 | Hardwick et al. |
| 2021/0308937 | A1 | 10/2021 | Broach et al. |
| 2021/0379664 | A1 | 12/2021 | Gibson et al. |
| 2021/0387253 | A1 | 12/2021 | Schweizer et al. |
| 2022/0023821 | A1 | 1/2022 | Aimone et al. |
| 2022/0049331 | A1 | 2/2022 | Anglés |
| 2022/0080522 | A1 | 3/2022 | Cox et al. |
| 2022/0176451 | A1 | 6/2022 | Schweizer et al. |
| 2022/0281005 | A1 | 9/2022 | Kandasamy |
| 2022/0388091 | A1 | 12/2022 | Norman et al. |
| 2023/0146110 | A1 | 5/2023 | Allison et al. |
| 2023/0356322 | A1 | 11/2023 | Haynie et al. |

FOREIGN PATENT DOCUMENTS

| | | |
|---|---|---|
| AU | 2019234726 A1 | 9/2019 |
| AU | 2019290657 A1 | 12/2019 |
| AU | 2019338384 A1 | 3/2020 |
| AU | 2019383418 A1 | 5/2020 |
| AU | 2018359514 C1 | 5/2021 |
| CA | 2569773 C | 4/2013 |
| CA | 3081330 A1 | 10/2018 |
| CA | 3093812 A1 | 3/2019 |
| CA | 3104289 A1 | 6/2019 |
| CA | 3112446 A1 | 9/2019 |
| CA | 3120796 A1 | 11/2019 |
| CN | 101537538 B | 1/2011 |
| CN | 101406987 B | 3/2012 |
| CN | 203843367 U | 9/2014 |
| CN | 104439686 A | 3/2015 |
| CN | 103639668 B | 12/2015 |
| CN | 105290608 A | 2/2016 |
| CN | 105750725 A | 7/2016 |
| CN | 103978304 B | 9/2016 |
| CN | 105965152 A | 9/2016 |
| CN | 106001905 A | 10/2016 |
| CN | 107030371 A | 8/2017 |
| CN | 206366652 U | 8/2017 |
| CN | 107160030 A | 9/2017 |
| CN | 107498175 A | 12/2017 |
| CN | 206925453 U | 1/2018 |
| CN | 107841744 A | 3/2018 |
| CN | 108372359 A | 8/2018 |
| CN | 108385101 A | 8/2018 |
| CN | 109202273 A | 1/2019 |
| CN | 107584122 B | 2/2019 |
| CN | 107116366 B | 3/2019 |
| CN | 110042385 A | 7/2019 |
| CN | 209272731 U | 8/2019 |
| CN | 110653618 A | 1/2020 |
| CN | 107900510 B | 2/2020 |
| CN | 109878084 B | 6/2020 |
| CN | 108971742 B | 7/2020 |
| CN | 109202273 B | 9/2020 |
| CN | 111655403 A | 9/2020 |
| CN | 211464825 U | 9/2020 |
| CN | 109202275 B | 10/2020 |
| CN | 111761198 A | 10/2020 |
| CN | 108603504 B | 11/2020 |
| CN | 109940163 B | 12/2020 |
| CN | 112108756 A | 12/2020 |
| CN | 108930034 B | 1/2021 |
| CN | 109570934 B | 2/2021 |
| CN | 112355463 A | 2/2021 |
| CN | 112404453 A | 2/2021 |
| CN | 112496522 A | 3/2021 |
| CN | 110640294 B | 4/2021 |
| CN | 112658460 A | 4/2021 |
| CN | 109570933 B | 5/2021 |
| CN | 112770884 A | 5/2021 |
| CN | 112828441 A | 5/2021 |
| CN | 110102871 B | 6/2021 |
| CN | 112958902 A | 6/2021 |
| CN | 113001007 A | 6/2021 |
| CN | 113020625 A | 6/2021 |
| CN | 113172331 A | 7/2021 |
| CN | 111531266 B | 8/2021 |
| CN | 214212574 U | 9/2021 |
| CN | 111230282 B | 10/2021 |
| CN | 113523534 A | 10/2021 |
| CN | 113695573 A | 11/2021 |
| CN | 113695593 A | 11/2021 |
| CN | 113828907 A | 12/2021 |
| CN | 214977765 U | 12/2021 |
| CN | 111055007 B | 1/2022 |
| CN | 215468782 U | 1/2022 |
| CN | 114131176 A | 3/2022 |
| CN | 217096135 U | 3/2022 |
| CN | 113172331 B | 4/2022 |
| CN | 114393292 A | 4/2022 |
| CN | 111575698 B | 5/2022 |
| CN | 111575699 B | 5/2022 |
| CN | 113146021 B | 6/2022 |
| CN | 114669858 A | 6/2022 |
| CN | 216780643 U | 6/2022 |
| CN | 111872543 B | 7/2022 |
| CN | 112025074 B | 7/2022 |
| CN | 113118612 B | 7/2022 |
| CN | 113351984 B | 7/2022 |
| CN | 114770784 A | 7/2022 |
| CN | 114799201 A | 7/2022 |
| CN | 114799480 A | 7/2022 |
| CN | 112407338 B | 8/2022 |
| CN | 113001005 B | 8/2022 |
| CN | 114833439 A | 8/2022 |
| CN | 114951954 A | 8/2022 |
| CN | 115055699 A | 9/2022 |
| CN | 115091022 A | 9/2022 |
| CN | 115156523 A | 10/2022 |
| CN | 115178855 A | 10/2022 |
| CN | 115351514 A | 11/2022 |
| CN | 217729675 U | 11/2022 |
| CN | 115502543 A | 12/2022 |
| CN | 115555700 A | 1/2023 |
| CN | 115673528 A | 2/2023 |
| CN | 115091025 B | 3/2023 |
| CN | 115740727 A | 3/2023 |
| CN | 218694877 U | 3/2023 |
| CN | 113927151 B | 4/2023 |
| CN | 114769922 B | 4/2023 |
| CN | 218799795 U | 4/2023 |
| CN | 218799797 U | 4/2023 |
| CN | 218799801 U | 4/2023 |
| CN | 116038093 A | 5/2023 |
| CN | 116140783 A | 5/2023 |
| CN | 116160108 A | 5/2023 |
| CN | 115106641 B | 6/2023 |
| CN | 115740726 B | 6/2023 |
| CN | 116423033 A | 7/2023 |
| CN | 116475558 A | 7/2023 |
| CN | 219336363 U | 7/2023 |
| CN | 219336364 U | 7/2023 |
| CN | 219379326 U | 7/2023 |
| CN | 116511543 A | 8/2023 |
| CN | 116571769 A | 8/2023 |
| CN | 116618816 A | 8/2023 |
| CN | 115673526 B | 9/2023 |
| CN | 116900465 A | 10/2023 |
| CN | 116900467 A | 10/2023 |
| CN | 116921840 A | 10/2023 |
| CN | 116926531 A | 10/2023 |
| CN | 220050404 U | 11/2023 |
| CN | 117340415 A | 1/2024 |
| CN | 220591878 U | 3/2024 |
| CN | 117943678 A | 4/2024 |
| DE | 19948441 A1 | 4/2001 |
| DE | 102014115535 B3 | 3/2016 |
| DE | 102015216802 A1 | 3/2017 |

(56) References Cited

FOREIGN PATENT DOCUMENTS

| | | |
|---|---|---|
| DE | 102016113289 A1 | 1/2018 |
| DE | 102019106873 A1 | 9/2020 |
| EP | 3251768 A1 | 12/2017 |
| EP | 3703888 A1 | 10/2018 |
| EP | 4129552 A1 | 2/2023 |
| FR | 3135002 A1 | 11/2023 |
| GB | 2306366 A | 5/1997 |
| GB | 2576260 B | 2/2020 |
| IN | 2023/31035542 A | 9/2023 |
| JP | 2000094159 A | 4/2000 |
| JP | 20000334577 A | 12/2000 |
| JP | 2003-322135 A | 11/2003 |
| JP | 3563003 B2 | 9/2004 |
| JP | 2004-311640 A | 11/2004 |
| JP | 2005-171299 A | 6/2005 |
| JP | 2007-061875 A | 3/2007 |
| JP | 2009006396 A | 1/2009 |
| JP | 2009-090295 A | 4/2009 |
| JP | 5573973 B2 | 1/2013 |
| JP | 6046954 B2 | 2/2013 |
| JP | 2013166159 A | 8/2013 |
| JP | 5864446 B2 | 2/2016 |
| JP | 2020059039 A | 4/2020 |
| JP | 2022-503795 A | 1/2022 |
| JP | 7148491 B2 | 10/2022 |
| KR | 10-0354387 B1 | 12/2002 |
| KR | 20100113400 A | 10/2010 |
| KR | 20110019270 A | 2/2011 |
| KR | 20110088266 A | 8/2011 |
| KR | 10-1230359 B1 | 2/2013 |
| KR | 20160128939 A | 11/2016 |
| KR | 2021113973 | 9/2019 |
| KR | 20210049085 A | 9/2019 |
| KR | 10-2101364 B1 | 4/2020 |
| KR | 20200087172 A | 7/2020 |
| KR | 20210010980 A | 1/2021 |
| KR | 10-2273514 B1 | 6/2021 |
| KR | 20210130704 A | 10/2021 |
| KR | 20230069412 A | 5/2023 |
| KR | 10-2595360 B1 | 10/2023 |
| TW | I688451 B | 3/2020 |
| WO | WO 1998/051441 A1 | 11/1998 |
| WO | WO 2000/020146 A1 | 4/2000 |
| WO | WO 2009/127981 A2 | 10/2009 |
| WO | WO 2011/017752 A1 | 2/2011 |
| WO | WO 2012/065616 A1 | 5/2012 |
| WO | WO 2012/141442 A2 | 10/2012 |
| WO | WO 2014/178731 A2 | 11/2014 |
| WO | WO 2016/072211 A1 | 5/2016 |
| WO | WO 2016/106179 A1 | 6/2016 |
| WO | WO 2017075396 A1 | 5/2017 |
| WO | WO 2019/089764 A1 | 5/2019 |
| WO | WO 2019/115968 A1 | 6/2019 |
| WO | WO 2019178138 A2 | 9/2019 |
| WO | WO 2019178138 A3 | 9/2019 |
| WO | WO 2019246251 A2 | 12/2019 |
| WO | WO 2019246251 A3 | 12/2019 |
| WO | WO 2019246251 A9 | 12/2019 |
| WO | WO 2020/015228 A1 | 1/2020 |
| WO | WO 2020055989 A1 | 3/2020 |
| WO | WO 2020106952 A1 | 5/2020 |
| WO | WO 2020/201299 A1 | 10/2020 |
| WO | WO 2021/030693 A2 | 2/2021 |
| WO | WO 2021/067978 A1 | 4/2021 |
| WO | WO 2021/165545 A1 | 8/2021 |
| WO | WO 2022032061 A1 | 2/2022 |
| WO | WO 2022231423 A1 | 11/2022 |
| WO | WO 2023087631 A1 | 5/2023 |
| WO | WO 2023/099872 A1 | 6/2023 |
| WO | WO 2024/078248 A1 | 4/2024 |

OTHER PUBLICATIONS

Grätzel, M., "Advances in friction stir welding by separate control of shoulder and probe", Welding in the World (2021) 54:1931-1941.

Ohashi, T. et al., "Fastenerless-Riveting Utilizing Friction Stir Forming for Dissimilar Materials Joining", Key Engineering Materials, Aug. 2017, ISSN: 1662-9795, vol. 751, pp. 186-191, doi: 10.4028/www.scientific.net/KEM.751.186.

Miedzinski Mattias, "Materials for Additive Manufacturing by Direct Energy Deposition", Chalmers University of Technology Master's Thesis in Materials Engineering, 2017, http://publications.lib.chalmers.se/records/fulltext/253822/253822.pdf.

Mahmood. M, et al. "Metal Matrix Composites Synthesized by Laser-Melting Deposition: A Review", MDPI.com/journal/materials—Materials, 2020, vol. 13, 02593. https://www.mdpi.com/1996-1944/13/11/2593.

Davis, "Theoretical analysis of transpiration cooling of a liquid rocket thrust chamber wall", Jul. 2008, engineering, https://www.semanticscholar.org/paper/Theoretical-analysis-of-transpiration-cooling-of-a-Davis/730bfd8ae66b0bb026e7bf5cae6b73a14cbf74df.

Luo et al. Effects of Coolants of Double Layer Transpiration Cooling System in the Leading Edge of a Hypersonic Vehicle, Frontiers in Energy Research www.frontiersin.org, Sep. 9, 2021, vol. 9, Article 756820, https://www.frontiersin.org/articles/10.3389/fenrg.2021.756820/full.

Ohashi, T. et al., "Pseudo linear joining for dissimilar materials utilizing punching and Friction Stir Forming", Procedia Manufacturing, 2020, vol. 50, pp. 98-103.

Cold Spray Additive Manufactured Combustion Chamber, Impact Innovations GmbH, https://impact-innovations.com/en/applications/combustion-chamber/, 4 pages, Jun. 24, 2023.

Russell et al. "Performance Improvement of Friction Stir Welds by Better Surface Finish", George C. Marshall Space Flight Center Research and Technology Report 2014, 2 Pages, Jan. 1, 2015.

Saju, T. P. et al., "Joining dissimilar grade aluminum alloy sheets using multi-hole dieless friction stir riveting process", The International Journal of Advanced Manufacturing Technology, 2021, 112: 285-302.

Zhao et al. "Interfacial Bonding Features of Friction Stir Additive Manufactured Build for 2195-T8 Aluminum-Lithium Alloy" Journal of Manufacturing Processes 38, Jan. 2019, 15 pages.

Li et al., "Cold Spray+ as New Hybrid Additive Manufacturing Technology: A Literature Review" Science and Technology of Welding and Joining, 24(5), Apr. 15, 2019, pp. 420-445.

Khodabakhshi et al., "Surface Modification of a Cold Gas Dynamic Spray-deposited Titanium Coating on Aluminum Alloy by Using Friction-Stir Processing" Journal of Thermal Spray Technology, vol. 28, Aug. 2019, pp. 1185-1198.

Wang et al. "High Performance Bulk Pure Al Prepared Through Cold Spray-friction Stir Processing Compositive Additive Manufacturing" Journal of Materials Research and Technology, 9(4), Jun. 2020, pp. 9073-9079.

Hassen et al. "A Comprehensive Review of Friction Stir Additive Manufacturing (FSAM) of Non-Ferrous Alloys" Materials 16(7): 2723, Mar. 2023, 31 pages.

Zhao et al. "Influence of Tool Shape and Process on Formation and Defects of Friction Stir Additive Manufactured Build" Journal of Materials Engineering, vol. 47 Issue 9, Sep. 2019, pp. 84-92.

Davis, "Theoretical Analysis of Transpiration Cooling of a Liquid Rocket Thrust Chamber Wall", 2006, Theses—Embry-Riddle Aeronautical University, Daytona Beach, Florida, 103 pages.

Wagner, J et al. "Method for Fabricating Metallic Panels with Deep Stiffener Sections" https://www.techbriefs.com/component/content/article/23860-lar-17976-1, Feb. 1, 2016, 5 pages.

Carter, RW et al. "Robotic Manufacturing of 18 ft. (5.5mm) Diameter Cryogenic Fuel Tank Dome Assemblies for the NASA Ares I Rocket", TWI 9th International Symposium on Friction Stir Welding 2012, May 15, 2012, 25 pages.

\* cited by examiner

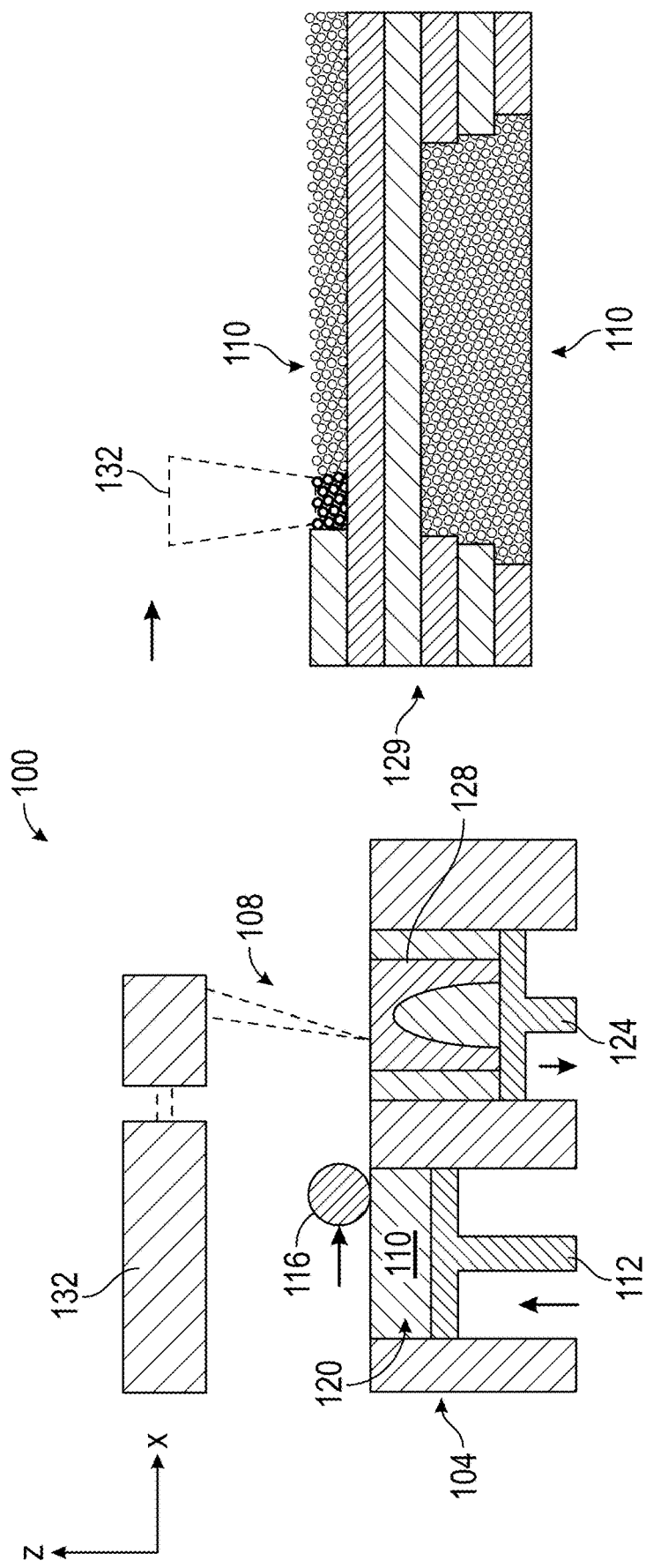

TRANSPIRATION-COOLED SYSTEMS HAVING PERMEABLE AND NON-PERMEABLE PORTIONS

BACKGROUND

Field

The technology relates generally to systems formed of permeable and non-permeable portions and methods related to the formation of the systems.

Description of the Related Art

Methods of forming parts using porous media typically involve numerous materials and manufacturing steps. For example, structural shells, refractory metal foams, and porous liners are typically employed. This can result in challenges in integrating different materials and suboptimal cooling efficiency in the porous media of the final part.

SUMMARY

The embodiments disclosed herein each have several aspects no single one of which is solely responsible for the disclosure's desirable attributes. Without limiting the scope of this disclosure, its more prominent features will now be briefly discussed. After considering this discussion, and particularly after reading the section entitled "Detailed Description" one will understand how the features of the embodiments described herein provide advantages over existing approaches or over existing systems formed of permeable and non-permeable portions and methods related to the formation of the systems.

Parts and structures having both permeable and non-permeable features and methods relating to the formation of the parts and/or structures are described herein. The parts and/or structures can be formed using 3D printing technologies to print a part that includes both sold or non-permeable portions and permeable portions formed from porous media. In one non-limiting example of the present disclosure, parts and structures are produced using a single-step laser powder bed fusion (LPBF) additive manufacturing process, where structural elements and permeable layers are formed integrally. The parts, structures, systems, and methods described herein can provide a number of advantages, for example, improving cooling efficiency, improving the ability to control coolant flow, and lowering manufacturing cost.

In one aspect, a nozzle for a rocket engine includes a non-permeable outer layer, a plurality of walls, a permeable layer, and a plurality of cooling channels. The non-permeable outer layer forms a predetermined shape of the nozzle. The non-permeable outer layer defines an interior space. The plurality of walls extend generally orthogonal to the non-permeable outer layer and into the interior space. The permeable layer is disposed between each set of adjacent walls of the plurality of walls. The permeable layer is spaced a distance from the non-permeable outer layer. The plurality of colling channels are formed between the permeable layer, the non-permeable outer layer, and a set of adjacent walls of the plurality of walls. The plurality of cooling channels configured to transport a fluid.

In some embodiments, the non-permeable outer layer, the plurality of walls, and the permeable layer comprise the same material. In some embodiments, at least a portion of the permeable layer is configured to be permeated by the fluid. In some embodiments, the permeable layers define at least a portion of an inner layer of the nozzle. In some embodiments, a density of the permeable layer increases from a portion of the layer enclosing each cooling channel to a portion of the layer forming an inner layer of the nozzle. In some embodiments, a first portion of each permeable layer is permeable to the fluid at a first rate and a second portion of each permeable layer is permeable to the fluid at a second rate. In some embodiments, the non-permeable outer layer, the plurality of walls, and the permeable layer are formed using a single material. In some embodiments, the outer layer and plurality of walls are integral.

In another aspect, an actively cooled structure for a re-entry vehicle includes a non-permeable inner layer, a plurality of walls, a permeable layer, and a plurality of cooling channels. The non-permeable inner layer forms a predetermined shape of the structure. The non-permeable inner layer has a first surface and a second surface. The first surface defines an interior space. The plurality of walls extend generally orthogonal to the non-permeable inner layer from the second surface. The permeable layer is disposed between each set of adjacent walls of the plurality of walls. The permeable layer is spaced a distance from the second surface of the non-permeable inner layer. The plurality of cooling channels are formed between the permeable layer, the non-permeable inner layer, and by a set of adjacent walls of the plurality of walls. The plurality of cooling channels configured to transport a fluid.

In some embodiments, the non-permeable inner layer, the plurality of walls, and the permeable layers comprise the same material. In some embodiments, at least a portion of the permeable layer is configured to be permeated by the fluid. In some embodiments, a density of the permeable layer increases from a portion of the layer enclosing each cooling channel to a portion of the layer forming an outer wall of the actively cooled structure. In some embodiments, a first portion of each permeable layer is permeable to the fluid at a first rate and a second portion of each permeable layer is permeable to the fluid at a second rate. In some embodiments, the non-permeable inner layer, the plurality of walls, and the permeable layer are formed using a single material. In some embodiments, the non-permeable inner layer and plurality of walls are integral. In some embodiments, the plurality of walls are stiffeners.

In another aspect, a method of forming a structure includes melting powder in a powder bed to form a set of non-permeable layers, the set of non-permeable layers forming a base having a plurality of walls extending orthogonal to the base; and melting powder in the powder bed to form a set of permeable layers, the permeable layers disposed between each set of adjacent walls of the plurality of walls, the permeable layers spaced a distance from the base such that channels are formed between the base and the set of permeable layers.

In some embodiments, the non-permeable layers form an outer structural wall of a nozzle and the permeable layers form at least a portion of an inner layer of the nozzle. In some embodiments, the non-permeable layers form an inner surface of the structure and the permeable layers form at least a portion of an outer surface of the part. In some embodiments, the channels are configured to transport a fluid and wherein the set of permeable layers are configured to receive at least a portion of the fluid transported through the channels. In some embodiments, laser powder bed fusion is used to form the structure.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. In some drawings, various structures according to embodiments of the present disclosure are schematically shown. However, the drawings are not necessarily drawn to scale, and some features may be enlarged while some features may be omitted for the sake of clarity. It will be readily understood that the aspects of the present disclosure, as generally described herein, and illustrated in the figures, can be arranged, substituted, combined, and designed in a wide variety of different configurations, all of which are explicitly contemplated and make part of this disclosure.

FIG. 1A is a schematic diagram illustrating an example laser powder bed fusion (LPBF) 3D printing process according to the present disclosure;

FIG. 1B is a schematic diagram illustrating layers of a part being formed using the example LPBF 3D printing process of FIG. 1A according to the present disclosure;

DETAILED DESCRIPTION

Figure 2A:
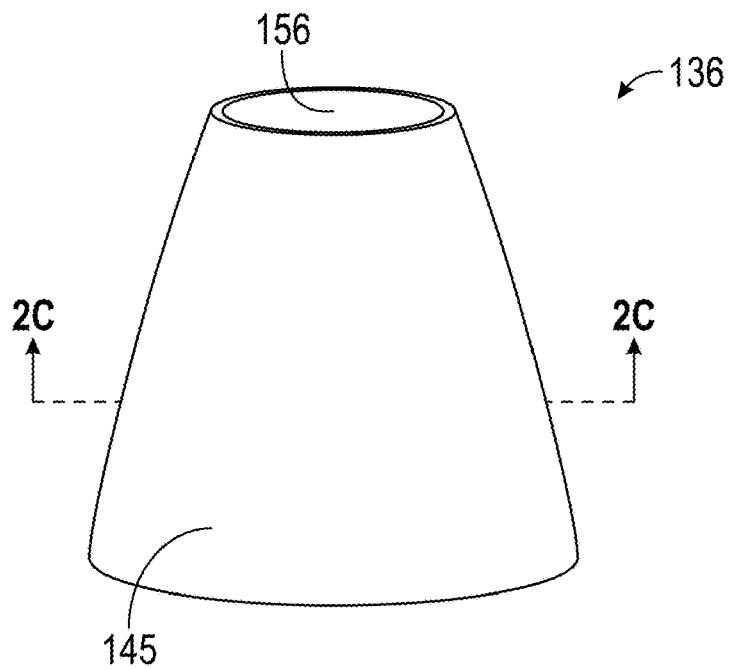
FIG. 2A is a side view of a nozzle for a rocket engine according to an embodiment of the present disclosure.

The following detailed description is directed to certain specific embodiments of the present disclosure. Reference in this specification to "one embodiment," "an embodiment," or "in some embodiments" means that a particular feature, structure, or characteristic described in connection with the embodiment is included in at least one embodiment of the present disclosure. The appearances of the phrases "one embodiment," "an embodiment," or "in some embodiments" in various places in the specification are not necessarily all referring to the same embodiment, nor are separate or alternative embodiments necessarily mutually exclusive of other embodiments. Moreover, various features are described which may be exhibited by some embodiments and not by others.

Various embodiments will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the present disclosure. Furthermore, embodiments of the present disclosure may include several novel features, no single one of which is solely responsible for its desirable attributes or which is essential to practicing the present disclosure.

The technology generally relates to parts and/or structures having both permeable and non-permeable features and methods relating to the formation of the parts and/or structures. Non-limiting example parts and structures include transpiration-cooled systems, such as engine combustion chambers, nozzles, and actively-cooled structures for re-entry vehicles. The parts and/or structures can be formed using 3D printing technologies to integrate porous media into the parts and/or structures. For example, methods of the present disclosure can use a laser powder bed fusion (LPBF) additive manufacturing process to print a part that can include both solid or non-permeable portions and permeable portions formed from porous media. The permeability of the porous media can be designed to control coolant flow rate in different areas of the parts and/or structures to achieve a desired and/or optimal heat flux.

The parts, structures, systems, and methods described herein can provide a number of advantages. For example, they can improve cooling efficiency, improve the ability to control coolant flow, and lower manufacturing cost. For example, the cooling efficiency can be improved by controlling the permeability of the cooling surface based on the local heat flux. Additionally, the manufacturing process to form parts and/or structures according to the present disclosure can be simplified. The manufacturing process can be improved by limiting the number of materials and reducing manufacturing steps. For example, the permeable and non-permeable portions can be printed in a single printing step. Further, there can be an elimination or reduction of material mismatch issues as the entire part and/or structure can be printed using the same material.

Various embodiments of the present disclosure will now be described with respect to the figures. FIG. 1A is a schematic diagram illustrating an example system 100 configured to form a part or structure 128 using a laser powder bed fusion (LPBF) 3D printing process according to the present disclosure. The system 100 can include a powder delivery system 104 and a fabrication powder bed 108. The powder delivery system 104 can be configured to transport and/or move powdered material 110 to the fabrication powder bed 108. For example, the powder delivery system 104 can include a delivery piston 112 and a spreader 116. The powdered material 110 can initially be positioned in a storing area 120 of the powder delivery system 104. The delivery piston 112 can be configured to move in a vertical direction (in this example, along the direction of the z-axis). The piston 112 can move in the z-axis direction to raise at least a portion of the powdered material 110 above a top surface of the storing area 120. The spreader 116 can be configured to push and/or move the powdered material 110 to the fabrication powder bed 108. The spreader 116 can move the powdered material 110 in a direction perpendicular to the motion of the delivery piston 112 (in this example, along the x-axis direction). The spreader 116 can move the powdered material 110 to the fabrication powder bed 108.

The fabrication powder bed 108 can define an area. A bottom surface of the area can be defined by a fabrication piston 124. The fabrication piston 124 can be configured to move in the z-axis direction to increase or decrease the area of the fabrication powder bed 108. A part 128 can be formed using the powdered material 110 that is within the fabrication powder bed 108.

The system 100 can include a heat source 132. Non-limiting examples of the heat source include a laser or electron beam. The heat source 132 can apply heat to predetermined areas of the powdered material 110 located within the fabrication powder bed 108. The heat source 132 can melt portions of the powdered material 110 to form portions of the part or structure 128. The part 128 can be formed layer-by-layer. For example, the powder delivery system 104 can move an initial amount of powdered material 110 to the fabrication powder bed 108. The heat source 132 can be used to form layers of melted material that can solidify to form portions of the part 128. Not all of the powdered material 110 that was initially moved to the fabrication powder bed 108 need be melted and solidified. The powder delivery system 104 can then move a second amount of powdered material 110 to the fabrication powder bed 108 and the process can be repeated to form additional layers of melted and solidified material.

For example, FIG. 1B illustrates powdered material 110 being melted by a heat source 132 according to the present disclosure. The heat source 132 can be implemented in the system 100 of FIG. 1A or another LPBF system. As shown, the heat source 132 can be used to melt portions of the powdered material 110 to form portions of a part 129. The part 129 can be formed layer by layer. For example, as depicted in FIG. 1B, the formed portions of the part that were melted and solidified are represented by the cross-hatched layers. The permeability of the melted and then solidified layers can vary. For example, some solidified portions of the part 129 can be non-permeable while other solidified portions of the part 129 can be permeable. The permeable portions according to the present disclosure can allow liquids, gases, or other materials to pass through the portions. The non-permeable portions according to the present disclosure can prevent liquids, gases, or other materials from passing through the portions according to a predetermined threshold. The permeable and non-permeable portions of the part can work together to improve structural efficiency in a fashion that is similar to composite sandwich structures and provide structural integrity that meet the design requirements.

Figure 2B:
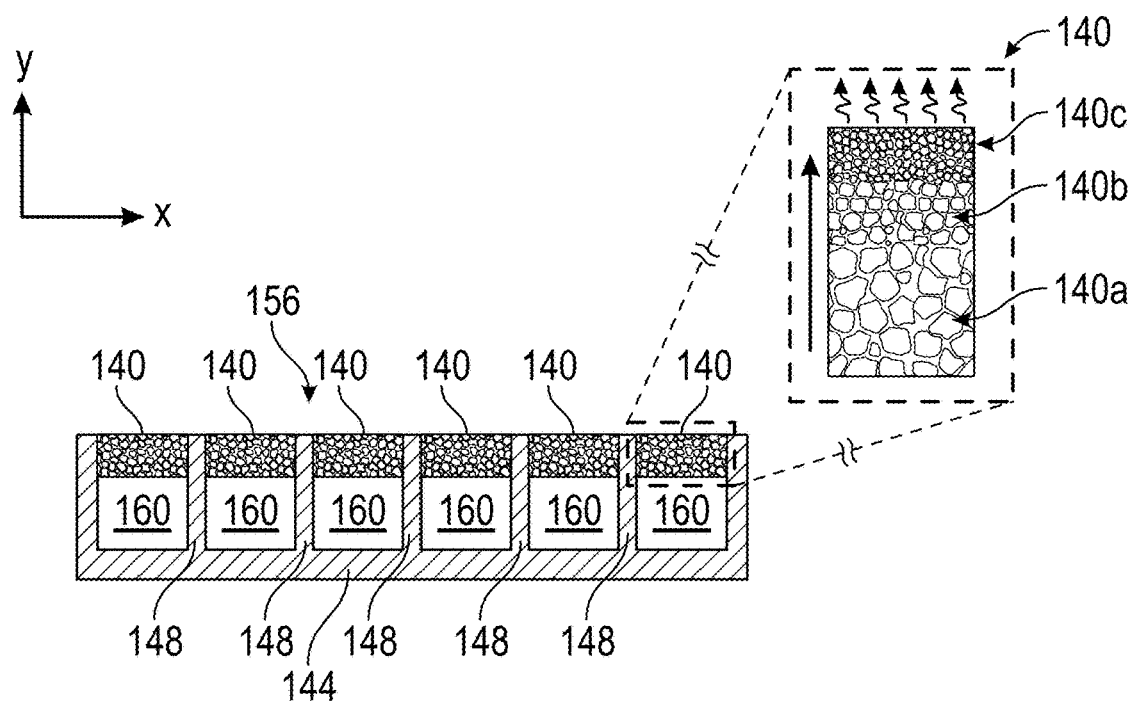
FIG. 2B is a portion of a cross-sectional view of the nozzle of FIG. 2A having permeable and non-permeable layers according to an embodiment of the present disclosure.
Figure 2C:
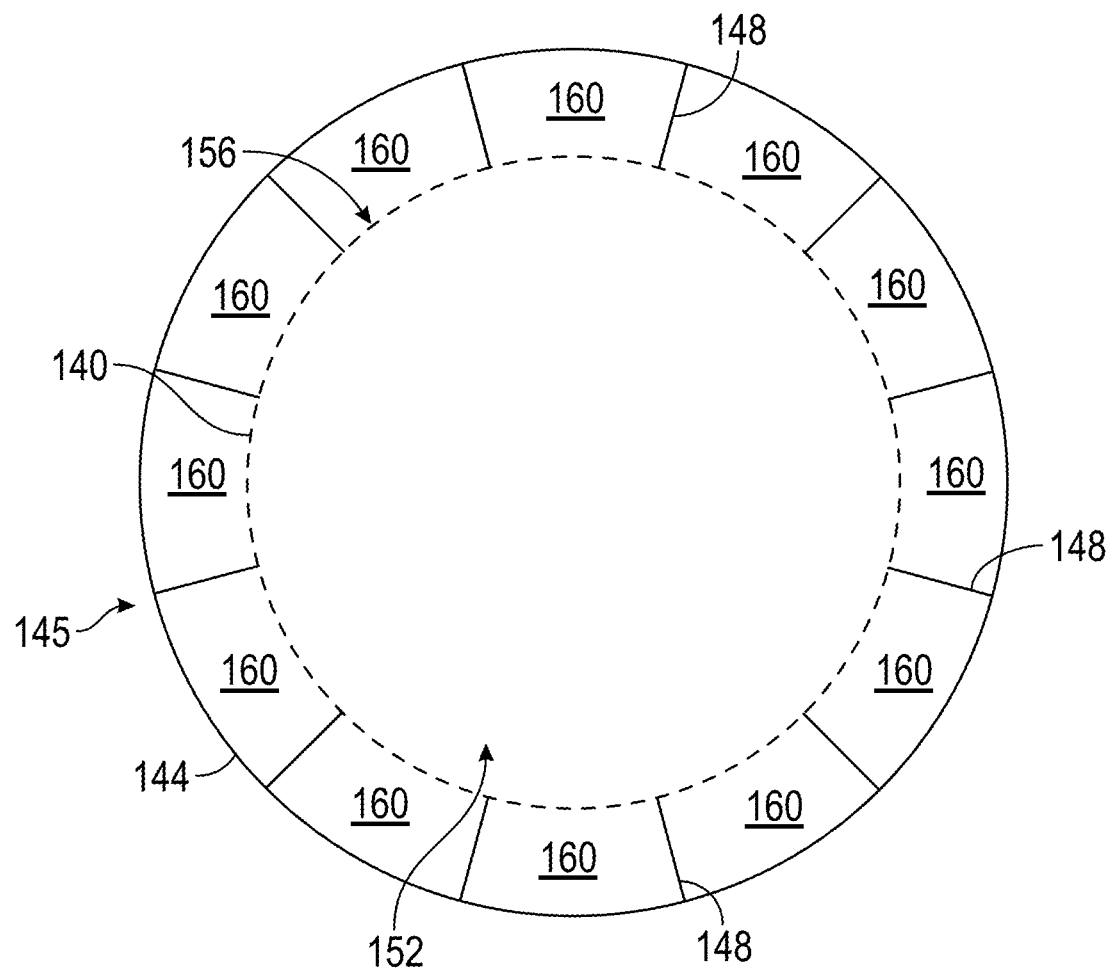
FIG. 2C is a cross-sectional view of the nozzle of FIG. 2A having permeable and non-permeable layers according to an embodiment of the present disclosure.

FIG. 2A is a side view of a nozzle 136 for a rocket engine according to an embodiment of the present disclosure. FIG. 2B is a cross-sectional view of a portion of a wall of the nozzle 136. FIG. 2C is a cross-sectional top view of the nozzle 136. The nozzle 136 can form, for example, a nozzle section or an aft jacket portion of a main combustion chamber (MCC) of a rocket engine. Liquid fuel and oxidizer are combusted within the MCC to expel the combusted propellants out the nozzle 136, generating thrust to propel a spacecraft, aircraft, missile or other vehicle. The MCC may be part of a propulsion system for a rocket, for example to provide propulsive thrust forces for launch, for second or later stage firings, or for orbital maneuvers. While features will be described in the context of an example engine nozzle depicted in FIGS. 2A-2C, embodiments of the present disclosure can be suitably implemented in any transpiration-cooled system, part, structure, or portions thereof, such as but not limited to engine combustion chambers, nozzles, and actively-cooled structures for re-entry vehicles.

The nozzle 136 can be formed using a 3D printing process. One non-liming example is the LPBF method described with reference to FIGS. 1A and 1B, but it will be understood that other 3D printing processes can be suitably implemented in accordance with embodiments of the present disclosure. The nozzle 136 can be formed to have one or more permeable portions 140 and one or more non-permeable portions 144. The nozzle 136 can also be formed to include a plurality of walls 148. The plurality of walls 148 can integrate or be formed of permeable or non-permeable materials, or combinations of these materials. In some embodiments, the plurality of walls 148 can form a single integral or unitary structure with either the one or more permeable portions 140 or the one or more non-permeable portions 144.

The non-permeable portions 144 can be completely consolidated or solidified during the formation process. For example, the non-permeable portions 144 can prevent or limit the liquid and/or material permeating through the permeable portions 144 from permeating through the non-permeable portions 144. The permeable portions 140 can have varying rates of permeability. For example, during the formation process, different layers of the permeable portions 140 can be formed to have a pre-determined level of permeability. Non-limiting examples of materials that can permeate the permeable portions 140 include liquids (for example, coolant or fuel), gases, and particulates. Non-limiting examples of porous media having permeable layers according to the present disclosure are shown in FIGS. 3A-3D.

Figure 3A:
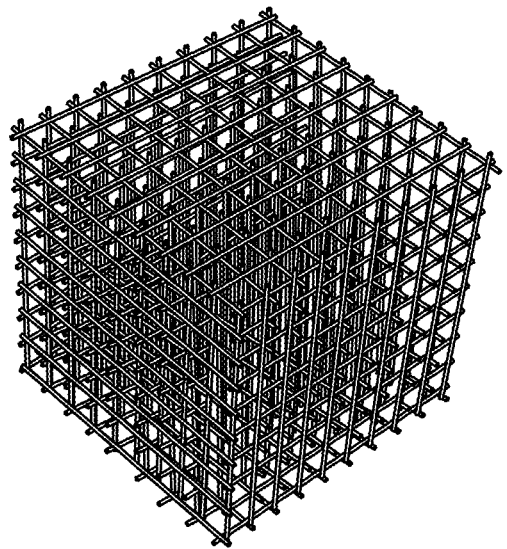
FIGS. 3A-3D are example embodiments of porous media having permeable layers according to the present disclosure.
Figure 3B:
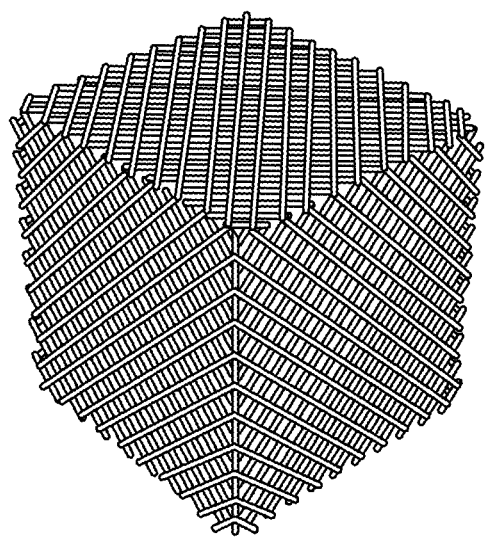
Figure 3C:
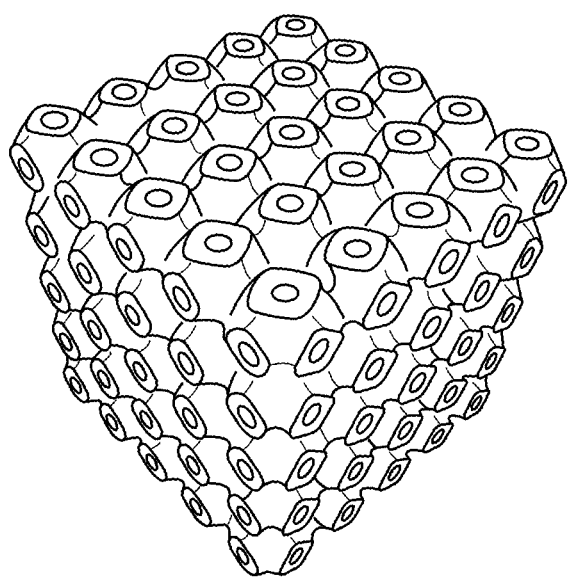
Figure 3D:
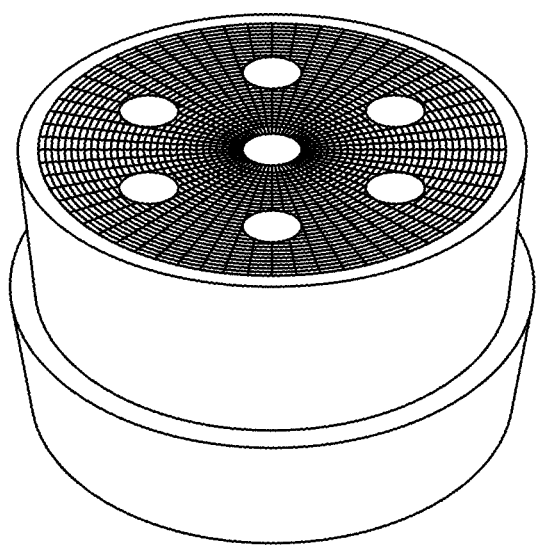

Advantageously, the permeability of the materials implemented in embodiments of the present disclosure can be adjusted through controlled printing parameters and geometrics. For example, an open area or spacing where no material is present can be adjusted to control the permeability. The volume and number of open areas can at least partially determine the permeability of the materials. For example, the larger the volume of an open area and/or the greater the number of open areas, the greater the rate of permeability. For another example, the smaller the volume of an open area and/or the smaller the number of open areas, the lower the rate of permeability. The pattern formed by the open areas and the material can at least partially determine the permeability. For example, as shown in FIG. 3A open areas in different layers of the structure can be positioned directly above or below other open areas, creating a mostly unobstructed open path extending through the structure. A pattern such as the one shown in FIG. 3A can have a greater rate of permeability than the patterns shown in FIGS. 3B and 3C, where material in one layer may overlap or partially cover one or more open areas in a layer above or below.

In some embodiments, a first permeable section can have a different pre-determined permeability than a second permeable section. In some embodiments, the layers of a permeable section can have different pre-determined permeability rates. For example, with reference to FIG. 2B, the permeability of the permeable portion 140 can change along the y-axis direction. The change in permeability can be caused by varying any suitable feature, including but not limited to the volume of open space, the number of open spaces, the shape of open spaces, and the density of open spaces. In some embodiments, the permeability of the permeable portion 140 can decrease along the y-axis direction as the permeable portion 140 approaches an inner layer or surface 156 of the nozzle 136. For example, the area 140a of the permeable portion 140 can have a greater permeability than the permeability of the areas 140b and 140c. The area 140c of the permeable portion 140 can have a lower permeability than the permeability of the areas 140a and 140b. In other terms, the area 140a of the permeable portion 140 can be permeable to a fluid at a first rate, the area 140b of the permeable portion 140 can be permeable to a fluid at a second rate, and the area 140c of the permeable portion 140 can be permeable to a fluid at a third rate. The first rate can be the same or different than the second rate. The first rate can be the same or different than the third rate. The second rate can be the same or different than the third rate. The porosity level can increase from area 104a to area 104b and increase from area 104b to area 104c. In some embodiments, the porosity level of area 104a can be between about 20 percent to about 30 percent. In some embodiments, the porosity level of area 104c can be up to or equal to about 95 percent.

The permeability of the layers can be determined by how much of the material is solidified during the LPBF process. The amount of the material that is solidified can impact various features that in turn can determine the permeability of different portions of the structure being formed. The amount of material solidified can impact the volume of open space (for example, material-free space) that exists. As the volume of open space increases the permeability of the structure can increase. The volume of material solidified during the LPBF process can impact the density of the structure being formed. In some embodiments, the determination of what material is solidified can form predetermined patterns of material and open space in each layer. The patterns of material and open space can affect features such as the shape, volume, and/or thickness of the areas of material as compared to the areas of open space, which in turn can determine the permeability (or lack of permeability) of the structures being formed.

Referring to FIGS. 2A-2C, the non-permeable portion 144 can form the structural jacket or outer layer 145 of the nozzle 136. The shape of the outer layer 145 can be predetermined during the formation process. The plurality of walls 148 can extend generally orthogonal to the outer layer 145 and toward an interior space 152 through which exhaust gases flow. The permeable portions 140 can be disposed between sets of adjacent walls of the plurality of walls 148, as illustrated in FIG. 2B. Alternatively, the permeable portions 140 can be positioned above or on top of the plurality of walls 148 to form a single continuous permeable layer. The permeable portions 140 and ends of the plurality of walls 148 can define the inner layer 156 of the nozzle 136. The inner layer 156 can define the interior space 152. It will be understood that FIG. 2B illustrates a schematic representation in which the non-permeable portion 144 is not curved, and that non-permeable portion 144 can be curved as illustrated in FIG. 2C. It will also be understood that while the permeable portions 140 illustrated in FIG. 2B are aligned linearly along the x-axis direction, the permeable portions 140 can be aligned along a curved or non-linear profile as illustrated in FIG. 2C.

A plurality of cooling channels 160 can be formed between the inner layer 156 and the outer layer 145 of the nozzle 136. The cooling channels 160 can form part of a cooling circuit of the MCC. Each cooling channel 160 can be formed by a portion of the non-permeable portion 144, a set of adjacent walls 148, and a permeable portion 140. The plurality of cooling channels 160 can be configured to transport a fluid, for example fuel. The fluid flowing through the cooling channels 160 can remove heat from the nozzle 136. In one example, coolant from a mid jacket portion of the MCC flows into the nozzle 136 and through the cooling channels 160 (in a direction perpendicular to the plane of the figure page) and out an outlet manifold. The outlet manifold can be optional. In some embodiments, the flow of the coolant can be an open cycle process. The cooling circuit may be implemented in an open cycle expander or an expander bleed cycle in which the coolant is a propellant, such as hydrogen.

At least a portion of the fluid flowing through the cooling channels 160 can permeate the permeable portion 140 and exit the permeable portion 140 through the inner layer 156 of the nozzle 136. As fluid (for example, fuel) travels through the cooling channels 160 and permeates the inner layer 156 of the nozzle 136, the fluid can exhale on the inner layer 156 of the nozzle 136. The fluid exhaling on the inner layer 156 of the nozzle 136 can assist in cooling the nozzle 136 and protect the inner layer 156 of the nozzle 136 from contacting oxygen.

The nozzle 136, as well as other parts and structures implementing features of the present disclosure described herein, offers various advantages and benefits. For example, the integrated design of permeable and non-permeable elements allows for an improved cooling efficiency. The improved cooling efficiency can be improved in part by having the ability to control the permeability of the permeable portions or elements. Embodiments of the present disclosure can improve transpiration cooling of the nozzle 136, in which fluid passing through the permeable portions absorbs heat from the nozzle 136 while also reducing heat flux into the surfaces of the nozzle 136. The use of permeable and non-permeable portions, as well as the ability to adjust the permeability, allow for control of the flow rate based on the heat flux. This in turn can create a more efficient process, as well as a reduction in the amount of coolant or fuel being used. There are also reduced manufacturing costs associated with the formation. In addition, embodiments of the nozzle 136 according to the present disclosure can have an extended life due to the elimination or reduction of oxidation, and the use of a single material to form both permeable and non-permeable portions can lead to a reduced material mismatch effect. Non-limiting example materials include Inconel 625, Inconel 718, copper, and aluminum.

Figure 4A:
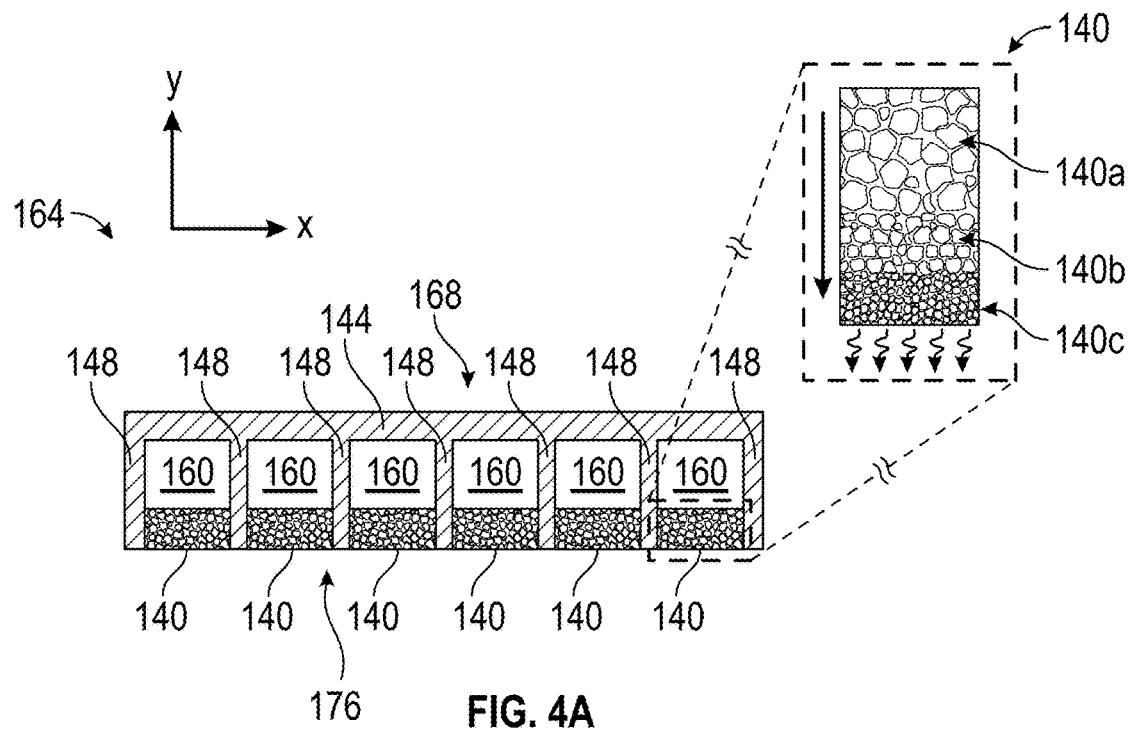
FIGS. 4A-4B are cross-sectional views of an actively-cooled structure for an engine combustion chamber assembly or re-entry vehicles according to an embodiment of the present disclosure.
Figure 4B:
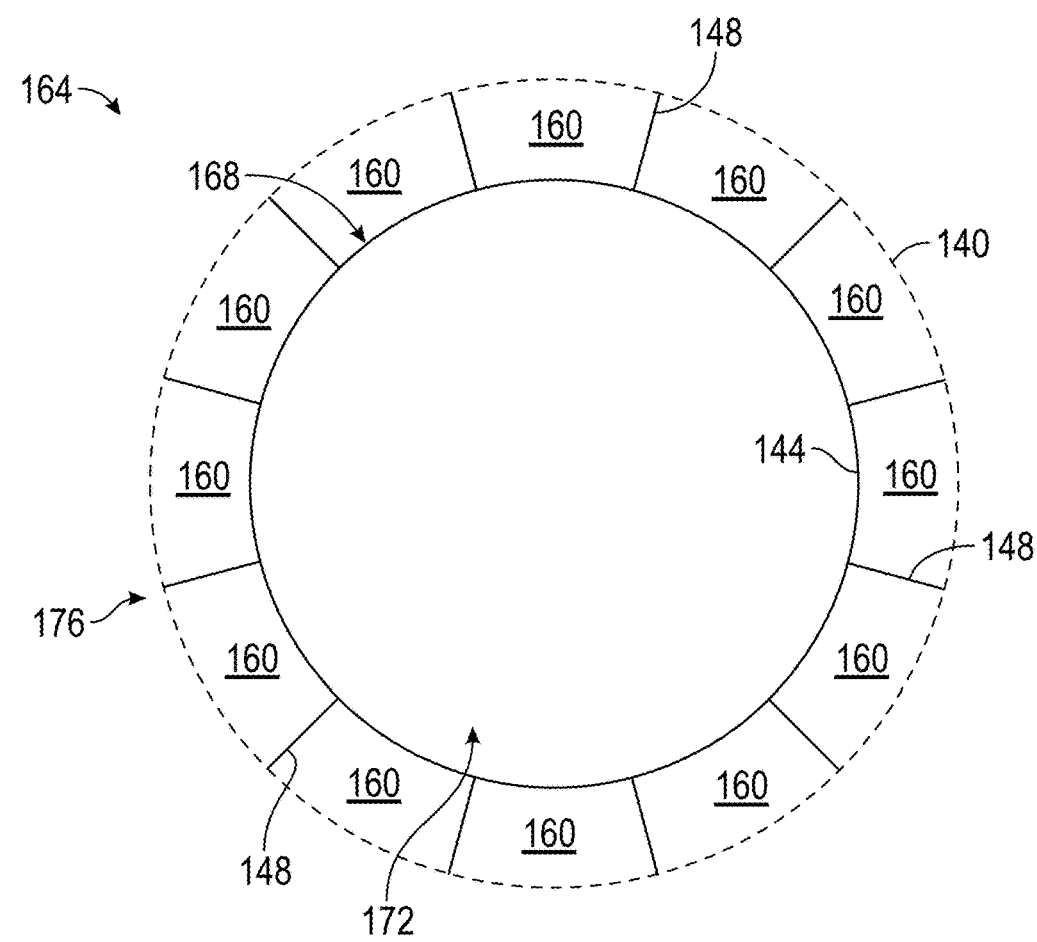
Figure 4C:
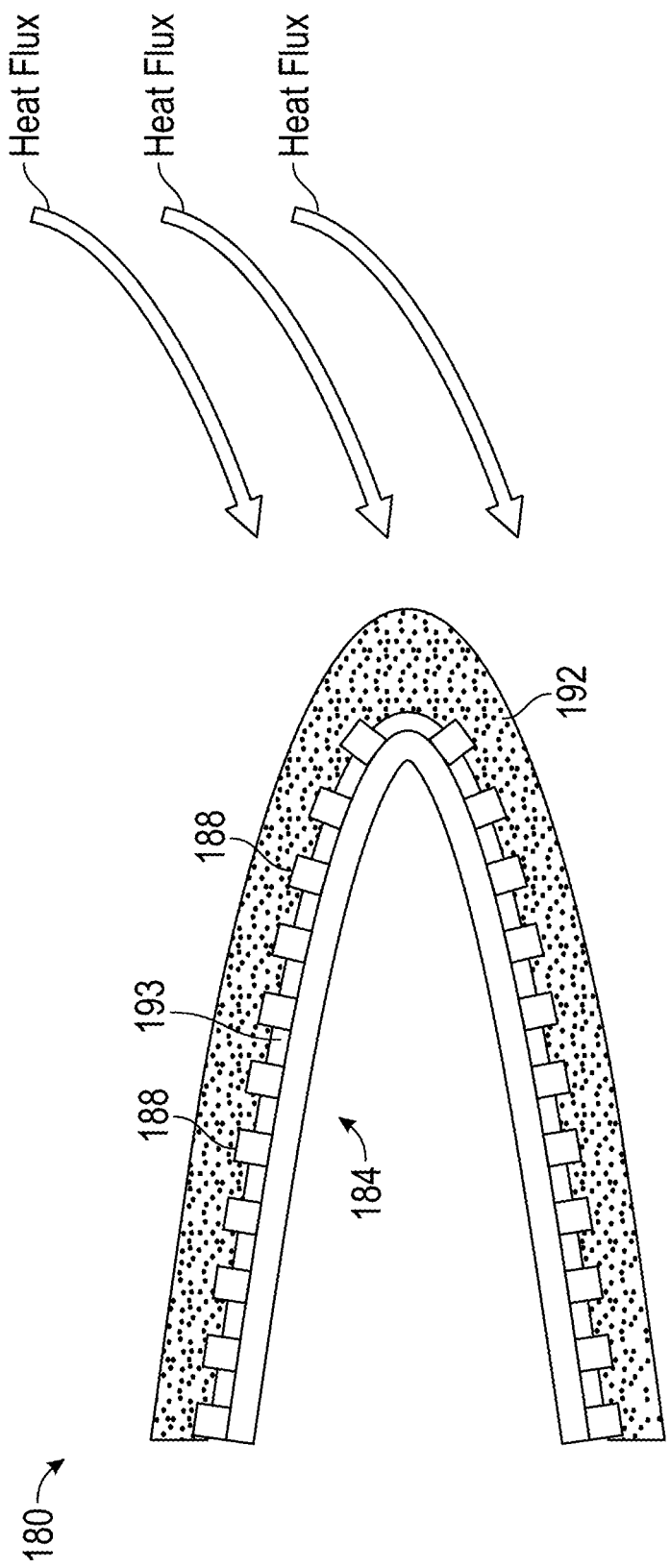
FIG. 4C is an example embodiment of a structure having actively-cooled leading edges according to an embodiment of the present disclosure.

FIGS. 4A-4C illustrate additional embodiments of parts and structures according to embodiments of the present disclosure, such as an actively-cooled structure for a re-entry vehicle and structures having actively-cooled leading edges. The parts and structures having properties similar to those described in relation to FIGS. 4A-4C can also be formed using 3D printing processes, such as but not limited to the LPBF methods described herein.

FIGS. 4A and 4B will be described in the context of an actively-cooled structure 164 for re-entry vehicles as a non-limiting example according to an embodiment of the present disclosure. It will be understood that actively-cooled structure 164 can be suitably implemented in many other kinds of systems where improved cooling is desirable, for example in engine combustion chamber assemblies or engine components. The actively-cooled structure 164 includes one or more permeable portions 140 and one or more non-permeable portions 144. The permeable portions 140 and non-permeable portion 144 can have material properties similar to those discussed above with reference to the nozzle 136. While material properties of the permeable portions 140 and the non-permeable portions 144 can be similar to those of nozzle 136 described above, the orientation and positioning of the permeable portions 140 and non-permeable portions 144 of the actively-cooled structure 164 differs. The actively-cooled structure 164 can have the permeable portions 140 forming an external-facing surface of the actively-cooled structure while the non-permeable portions 144 can form an internal-facing surface. This is in contrast to the nozzle 136, where the permeable portions 140 can form an internal-facing surface and the non-permeable portions 144 can form an external-facing surface.

The actively cooled structure 164 can also be formed to include a plurality of walls 148. In some embodiments, the plurality of walls 138 can function as integrated stringers or integrated stiffeners. The plurality of walls 148 can integrate and/or be formed of permeable or non-permeable materials, or combinations of these materials. In some embodiments, the plurality of walls 148 can form a single integral or unitary structure with either the one or more permeable portions 140 or the one or more non-permeable portions 144.

As described above, the non-permeable portions 144 can be completely consolidated or solidified during the formation process. For example, the non-permeable portions 144 can prevent or limit the liquid and/or material permeating through the permeable portions 140 from permeating through the non-permeable portions 144. The permeable portions 140 can have varying rates of permeability. For example, during the formation process, different layers of the permeable portions 140 can be formed to have a pre-determined level of permeability. Non-limiting examples of porous media having permeable layers according to the present disclosure are shown in FIGS. 3A-3D. Advantageously, the permeability of the materials implemented in embodiments of the present disclosure can be adjusted through controlled printing parameters and geometrics. For example, an open area or spacing where no material is present can be adjusted to control the permeability. The volume and number of open areas can at least partially determine the permeability of the materials. For example, the larger the volume of an open area and/or the greater the number of open areas, the greater the rate of permeability. For another example, the smaller the volume of an open area and/or the smaller the number of open areas, the lower the rate of permeability. The pattern formed by the open areas and the material can at least partially determine the permeability. For example, as shown in FIG. 3A open areas in different layers of the structure can be positioned directly above or below other open areas, creating a mostly unobstructed open path extending through the structure. A pattern such as the one shown in FIG. 3A can have a greater rate of permeability than the patterns shown in FIGS. 3B and 3C, where material in one layer may overlap or partially cover one or more open areas in a layer above or below.

In some embodiments, a first permeable section can have a different pre-determined permeability than a second permeable section. In some embodiments, the layers of a permeable section can have different pre-determined permeability rates. For example, with reference to FIG. 4A, the permeability of the permeable portion 140 can change along the y-axis direction. The change in permeability can be caused by varying any suitable feature, including but not limited to the volume of open space, the number of open spaces, the shape of open spaces, and the density of open spaces. In some embodiments, the permeability of the permeable portion 140 can decrease along the y-axis direction as the permeable portion 140 approaches an outer layer or surface 176 of the actively cooled structure 164. For example, the area 140a of the permeable portion 140 can have a greater permeability than the permeability of the areas 140b and 140c. The area 140c of the permeable portion 140 can have a lower permeability than the permeability of the areas 140a and 140b. In other terms, the area 140a of the permeable portion 140 can be permeable to a fluid at a first rate, the area 140b of the permeable portion 140 can be permeable to a fluid at a second rate, and the area 140c of the permeable portion 140 can be permeable to a fluid at a third rate. The first rate can be the same or different than the second rate. The first rate can be the same or different than the third rate. The second rate can be the same or different than the third rate. The permeable portions 140 can be designed to achieve precisely controlled fluid or coolant flow rate in different areas of the structures based on the heat flux.

The non-permeable portion 144 can form an inner layer 168 of the actively-cooled structure 164. The plurality of walls 148 can extend generally orthogonal to the inner layer 168 and away from an interior space 172, the interior space 172 being defined by the inner layer 168. The permeable portions 140 can be disposed between sets of adjacent walls of the plurality of walls 148, as illustrated in FIG. 4A. Alternatively, the permeable portions 140 can be positioned above or on top of the plurality of walls 148 to form single continuous permeable layer. The permeable portions 140 and ends of the plurality of walls 148 can define the outer layer 176 of the actively-cooled structure 164. It will be understood that FIG. 4A illustrates a schematic representation in which the non-permeable portion 144 is not curved, and that non-permeable portion 144 can be curved as illustrated in FIG. 4B. It will also be understood that while the permeable portions 140 illustrated in FIG. 4A are aligned linearly along the x-axis direction, the permeable portions 144 can be aligned along a curved or non-linear profile as illustrated in FIG. 4B.

Similar to the nozzle 136 described above, the actively-cooled structure 164 can include a plurality of cooling channels 160 formed between the inner layer 168 and the outer layer 172 of the actively-cooled structure 164. Each cooling channel 160 can be formed by a portion of the non-permeable portion 144, a set of adjacent walls 148, and a permeable portion 140. The plurality of cooling channels 160 can be configured to transport a fluid. The fluid flowing through the cooling channels 160 can remove heat from the actively-cooled structure 164.

At least a portion of the fluid flowing through the cooling channels 160 can permeate the permeable portion 140 and exit the permeable portion 140 through the outer surface of the actively cooled structure 164. As fluid travels through the cooling channels 160 and permeates the outer layer of the actively-cooled structure 164, the fluid can exhale on the outer layer of the actively-cooled structure 164. The fluid exhaling on the outer layer of the actively-cooled structure 164 can assist in cooling of the actively cooled structure 164.

Actively-cooled structures, particularly structures with integrated stiffeners or stringers, can generally be complex structures to form. The embodiments described herein solve some of these complexities by providing a low-cost manufacturing option, a high cooling efficiency, a self-stabilizing product, and a simple design where portions of the structure (for example, the plurality of walls 148) can function both as walls of cooling channels and integrated stiffeners and/or stringers. A self-stabilizing product can include a non-permeable or non-porous region (for example, a thin panel) having integrated stiffeners formed of porous and non-porous media. The structure can have increased stability under compression and shear load as compared to a thin panel without the integrated stiffeners. Additionally, the structure can be more mass efficient than a thick panel.

FIG. 4C is an example embodiment of a structure 180 having actively-cooled leading edges according to an embodiment of the present disclosure. The structure 180 can include an inner layer 184. The inner layer 184 can be formed using any suitable method, including but not limited to a 3D printing process. The inner layer 184 can integrate and/or be formed of non-permeable materials, such as but not limited to those described herein. The structure 180 can include integrated stiffeners 188. The integrated stiffeners 188 can integrate and/or be formed of non-permeable materials, such as but not limited to those described herein. The integrated stiffeners 188 can be positioned generally orthogonal to the inner layer 184 or many other patterns for higher efficiency. Two adjacent integrated stiffeners 188 can define coolant channels 193. The coolant channels 193 can also be defined at least partially by the inner layer 184 and at least partially by the exterior layer 192.

The structure 180 can include an exterior layer 192. The exterior layer 192 can be formed using any suitable method, including not limited to a 3D printing process. The exterior layer 192 can integrate and/or be formed of porous media having permeable layers, such as but not limited to those described herein. The permeable features allow for the exterior layer 192 to provide highly efficient transpiration cooling. The permeable material in the exterior layer 192 can achieve transpiration cooling that reduces heat flux into the surface of the structure 180.

The permeable layers of the exterior layer 192 can have areas of changing permeability, for example, as described with reference to FIGS. 2B, 3A-3D and 4A. As described herein, the permeability can be predetermined and adjusted by the amount of the material that is solidified and/or the patterns of material and open space of the structures being formed. The permeable material in the exterior layer 192 can achieve transpiration cooling that reduces heat flux into the surface of the structure 180. Additionally, the permeable layers of the exterior layer 192 can provide additional stability to the inner layer 184. The use of the permeable layers of the exterior layer 192 to improve stability can improve the overall structural efficiency and reduce the overall weight of the structure.

While the above detailed description has shown, described, and pointed out novel features of the present disclosure as applied to various embodiments, it will be understood that various omissions, substitutions, and changes in the form and details of the device or process illustrated may be made by those skilled in the art without departing from the spirit of the present disclosure. As will be recognized, the present disclosure may be embodied within a form that does not provide all of the features and benefits set forth herein, as some features may be used or practiced separately from others. All changes which come within the meaning and range of equivalency of the claims are to be embraced within their scope.

The term "comprising" as used herein is synonymous with "including," "containing," or "characterized by," and is inclusive or open-ended and does not exclude additional, unrecited elements or method steps. With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches. For example, terms such as about, approximately, substantially, and the like may represent a percentage relative deviation, in various embodiments, of ±1%, ±5%, ±10%, or ±20%.

The above description discloses several methods and materials of the present disclosure. The present disclosure is susceptible to modifications in the methods and materials, as well as alterations in the fabrication methods and equipment. Such modifications will become apparent to those skilled in the art from a consideration of this disclosure. Consequently, it is not intended that the present disclosure be limited to the specific embodiments disclosed herein, but that it covers all modifications and alternatives coming within the true scope and spirit of the present disclosure.

What is claimed is:

1. A nozzle for a rocket engine comprising:
   a non-permeable outer layer forming a predetermined shape of the nozzle, the non-permeable outer layer defining an interior space;
   a plurality of walls, each wall comprising a first side and a second side extending generally orthogonal to the non-permeable outer layer and into the interior space;
   a plurality of permeable layers, a permeable layer of the plurality of permeable layers disposed between the first side of a first wall of the plurality of walls and the second side of a second, adjacent wall of the plurality of walls, the permeable layer comprising an outermost surface spaced a distance from the non-permeable outer layer and an innermost surface opposite the outermost surface, wherein the first side and the second side of each of the plurality of walls terminate at an innermost surface, and wherein the innermost surface of the first wall, the innermost surface of the permeable layer, and the innermost surface of the second wall define a continuous portion of an inner circumference of the nozzle; and
   a plurality of cooling channels extending between an intake end and an exhaust end of the nozzle, a cooling channel of the plurality of cooling channels defined by the outermost surface of the permeable layer, the non-permeable outer layer, the first side of the first wall, and the second side of the second, adjacent wall, the cooling channel configured to transport a fluid.

2. The nozzle of claim 1, wherein the non-permeable outer layer, the plurality of walls, and the plurality of permeable layers comprise the same material.

3. The nozzle of claim 1, wherein the outermost surface and the innermost surface of the permeable layer are configured to be permeated by at least a portion of the fluid, and wherein the first side of the first wall and the second side of the second, adjacent wall are configured to contact the at least a portion of the fluid that permeates the outermost surface and the innermost surface of the permeable layer.

4. The nozzle of claim 1, wherein a density of the permeable layer increases from the outermost surface of the permeable layer to the innermost surface of the permeable layer.

5. The nozzle of claim 4, wherein a first portion of each permeable layer is permeable to the fluid at a first rate and a second portion of each permeable layer is permeable to the fluid at a second rate.

6. The nozzle of claim 1, wherein the non-permeable outer layer, the plurality of walls, and the plurality of permeable layers are formed using a single material.

7. The nozzle of claim 1, wherein the non-permeable outer layer and the plurality of walls are integral.

8. The nozzle of claim 1, wherein an innermost surface of each of the plurality of permeable layers and the innermost surface of each of the plurality of walls define a circumference of an interior surface of the nozzle.

9. The nozzle of claim 1, wherein the plurality of permeable layers extend between the intake end and the exhaust end of the nozzle.

10. The nozzle of claim 9, wherein, when the fluid is transported in the cooling channel, the fluid is in contact with the outermost surface of the permeable layer between the intake end and the exhaust end of the nozzle.

11. The nozzle of claim 1, wherein the permeable layer is in contact with the first side of the first wall of the plurality of walls and the second side of the second, adjacent wall of the plurality of walls.

12. A rocket engine comprising:
    a non-permeable layer defining an interior space;
    a plurality of walls, each wall comprising a first side and a second side extending from the non-permeable layer and into the interior space;
    a plurality of permeable layers, a permeable layer of the plurality of permeable layers disposed between the first side of a first wall of the plurality of walls and the second side of a second, adjacent wall of the plurality of walls, the first side and the second side of each of the plurality of walls terminating at an innermost surface, an innermost surface of each of the plurality of permeable layers and the innermost surface of each of the plurality of walls defining a circumference of an interior surface of the rocket engine; and
    a plurality of cooling channels extending between an intake end and an exhaust end of a nozzle of the rocket engine, a cooling channel of the plurality of cooling channels defined by an outermost surface of the permeable layer, the non-permeable layer, the first side of the first wall, and the second side of the second, adjacent wall, the cooling channel configured to transport a fluid.

13. The rocket engine of claim 12, wherein the non-permeable layer, the plurality of walls, and the plurality of permeable layers comprise the same material.

14. The rocket engine of claim 12, wherein the outermost surface and an innermost surface of the permeable layer are configured to be permeated by at least a portion of the fluid, and wherein the first side of the first wall and the second side of the second, adjacent wall are configured to contact the at least a portion of the fluid that permeates the outermost surface and the innermost surface of the permeable layer.

15. The rocket engine of claim 12, wherein a density of the permeable layer increases from the outermost surface of the permeable layer to the innermost surface of the permeable layer.

16. The rocket engine of claim 12, wherein a first portion of the permeable layer is permeable to the fluid at a first rate and a second portion of the permeable layer is permeable to the fluid at a second rate.

17. The rocket engine of claim 12, wherein the non-permeable layer, the plurality of walls, and the plurality of permeable layers are formed using a single material.

18. The rocket engine of claim 12, wherein the non-permeable layer and the plurality of walls are integral.

19. The rocket engine of claim 12, wherein the plurality of permeable layers extend between the intake end and the exhaust end of the nozzle of the rocket engine, and wherein, when the fluid is transported in the cooling channel, the fluid is in contact with the outermost surface of the permeable layer between the intake end and the exhaust end of the nozzle.

20. The rocket engine of claim 12, wherein the permeable layer is in contact with the first side of the first wall of the plurality of walls and the second side of the second, adjacent wall of the plurality of walls.

* * * * *